(12) United States Patent
Horita

(10) Patent No.: US 7,525,566 B2
(45) Date of Patent: Apr. 28, 2009

(54) APPARATUS FOR OBTAINING DATA ON THE THREE-DIMENSIONAL SHAPE

(75) Inventor: Shinichi Horita, Amagasaki (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 940 days.

(21) Appl. No.: 10/943,951

(22) Filed: Sep. 20, 2004

(65) Prior Publication Data

US 2005/0041096 A1 Feb. 24, 2005

Related U.S. Application Data

(63) Continuation of application No. 09/580,633, filed on May 30, 2000, now abandoned.

(30) Foreign Application Priority Data

May 31, 1999 (JP) ................................. 11-151046

(51) Int. Cl.
*H04N 13/00* (2006.01)
*G02B 26/081* (2006.01)
(52) U.S. Cl. ........................................ 348/42; 359/216
(58) Field of Classification Search .................... 348/42; 382/154; 359/216, 312; 345/419; 356/609
See application file for complete search history.

(56) References Cited

U.S. PATENT DOCUMENTS 4,982,438 A * 1/1991 Usami et al. ................ 382/154
5,305,092 A * 4/1994 Mimura et al. .............. 356/609
5,566,280 A * 10/1996 Fukui et al. ................. 345/419
5,747,822 A 5/1998 Sinclair et al.
5,864,640 A * 1/1999 Miramonti et al. .......... 382/312
5,870,220 A * 2/1999 Migdal et al. ............... 359/216
6,044,170 A * 3/2000 Migdal et al. ............... 382/154

FOREIGN PATENT DOCUMENTS

JP 2000-180137 2/1944

OTHER PUBLICATIONS

Minolta Catalog, Vivid 700 Non-Contact 3-D Digitizer, (the display examples are shown on p. 3, 4 pages.
Japanese Office Action dated Jul. 29, 2008 in corresponding Japanese Application.

* cited by examiner

*Primary Examiner*—Gims S Philippe
(74) *Attorney, Agent, or Firm*—Buchanan Ingersoll & Rooney PC

(57) ABSTRACT

An apparatus for obtaining data on the three-dimensional shape is provided with: a device for producing data on the three-dimensional shape of an object; a display device for displaying an image based on the data produced by the producing device; a viewpoint variator for changing a viewpoint of the image displayed on the display device; and a position changer for changing the relative positional relationship between the object and the producing device in accordance with the viewpoint change by the viewpoint variator.

24 Claims, 8 Drawing Sheets

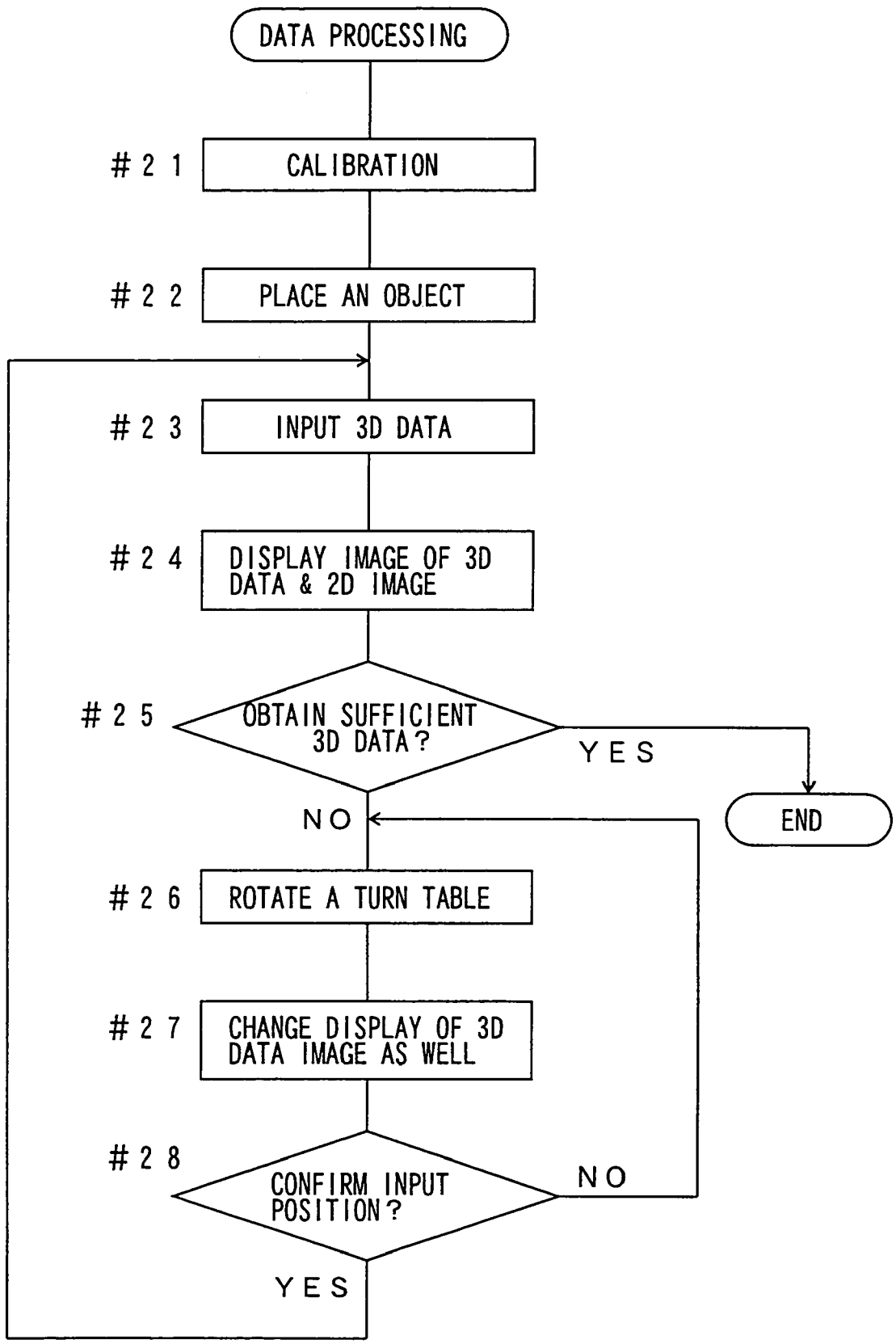

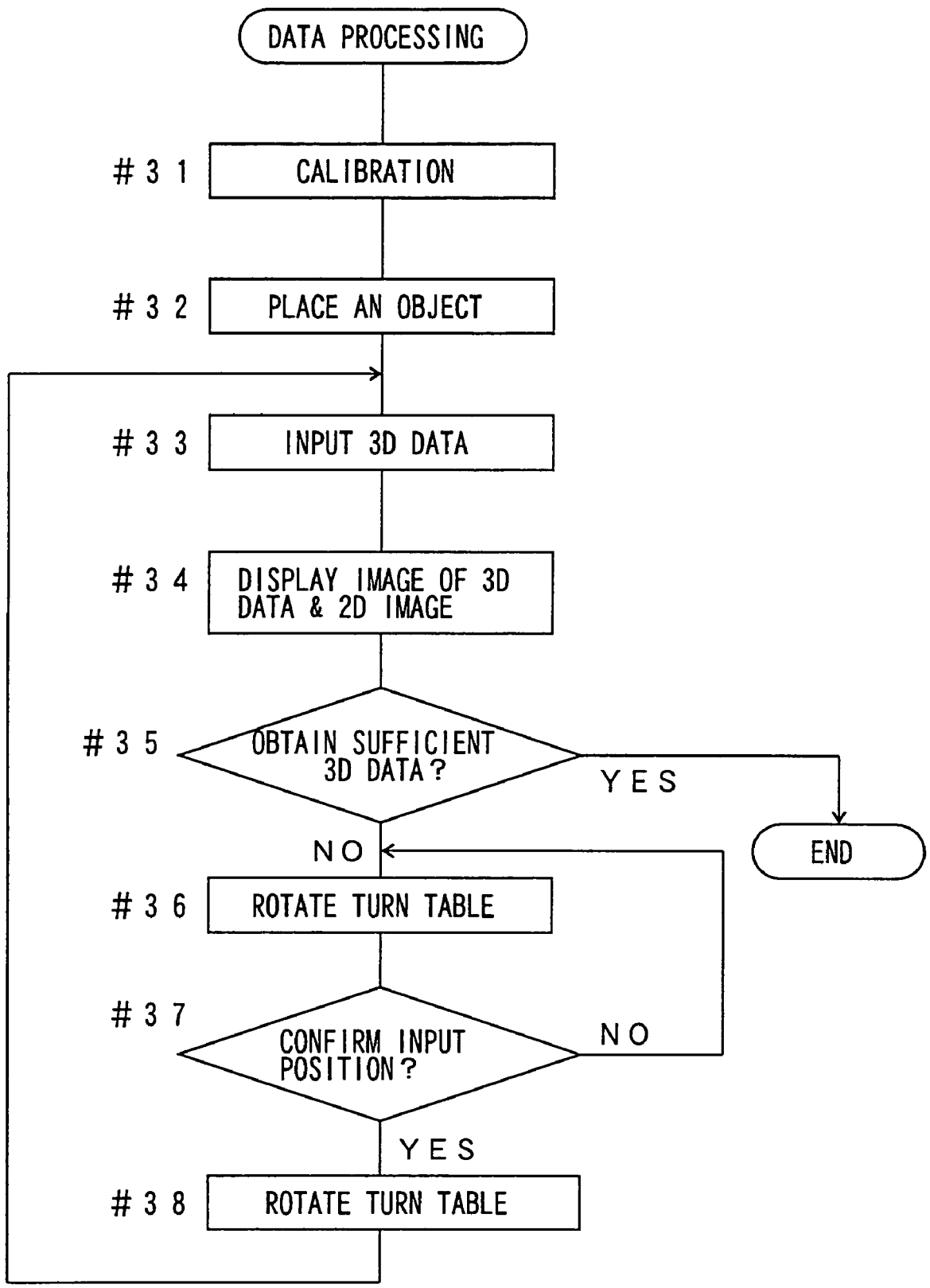

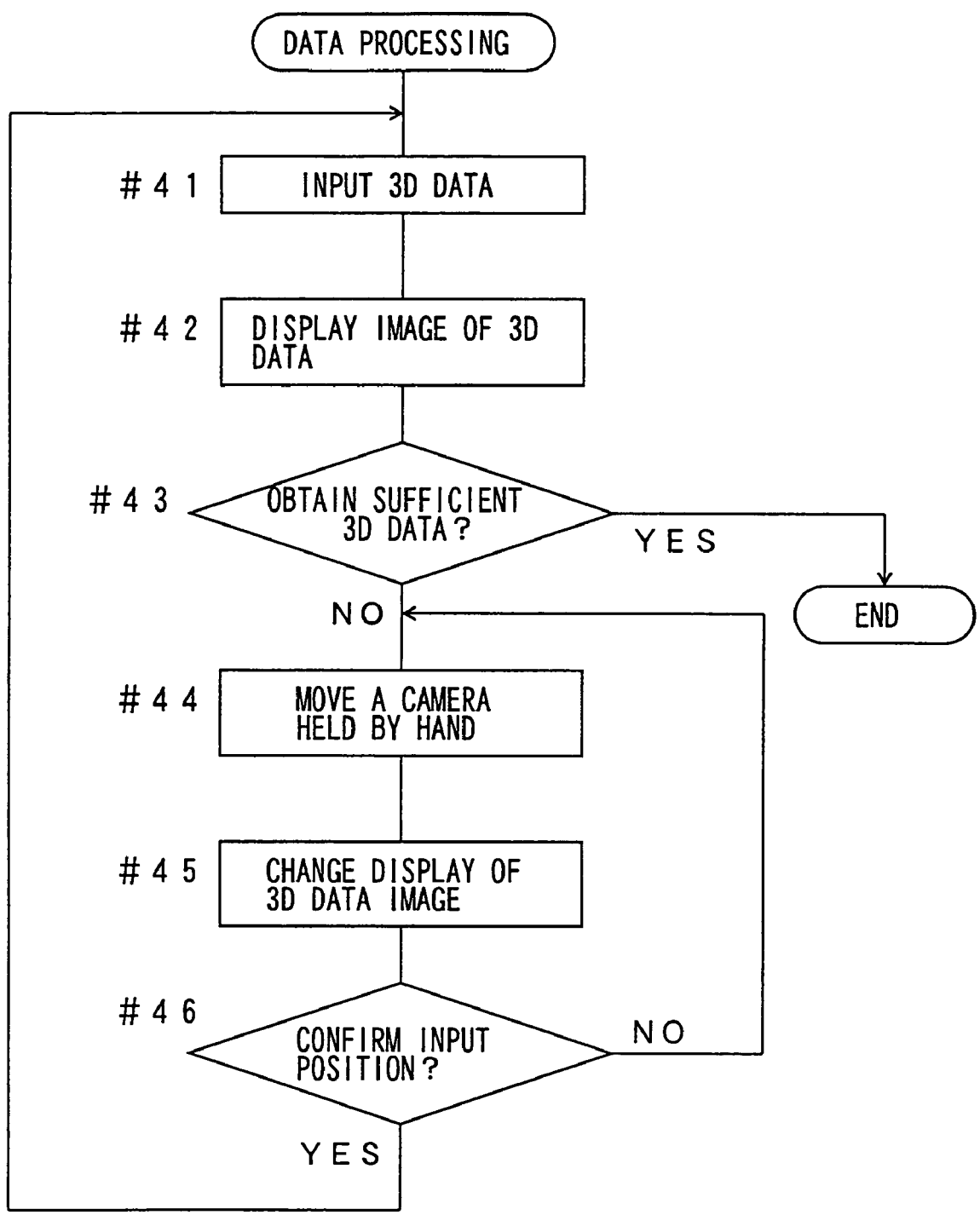

APPARATUS FOR OBTAINING DATA ON THE THREE-DIMENSIONAL SHAPE

This application is a continuation of application Ser. No. 09/580,633 filed May 30, 2000, now abandoned and is based on Japanese Patent Application No. 151046/1999 filed May 31, 1999, the entire contents of both which are incorporated herein by reference.

BACKGROUND OF THE INVENTION

1. Field of the Invention

The present invention relates to an apparatus for obtaining data on the three-dimensional shape of an object.

2. Description of the Prior Art

Conventionally, apparatuses constituted of a rotation stage, a three-dimensional camera and a computer, etc. have been known as a device for obtaining data on the three-dimensional shape indicating the entire periphery of an object (subject) having a three-dimensional shape.

The rotation stage is provided with a turn table that can rotate around the vertical axis, and an object is placed on this turn table. The three-dimensional camera is installed outside of the rotation stage so as to pick up an image of the object on the rotation stage.

Upon obtaining data on the three-dimensional shape indicating the entire periphery of the object, an image-pick-up process is carried out by rotating the rotation stage at every appropriate angles so as to change the relative positional relationship between the object and the three-dimensional camera. Thus, data on the three-dimensional shape taken in a plurality of pick-up directions are obtained with respect to the object. An image based on the data on the three-dimensional shape taken in the respective pick-up directions are displayed on a monitor screen connected to the three-dimensional camera or the computer. Each of the data on the three-dimensional shape indicates a part of the object. The user is allowed to watch the monitor screen and confirm the obtaining status of the respective data on the three-dimensional shape.

Upon completion of the image-pick-up process, the pieces of data on the three-dimensional shape obtained in relation to the respective image-pick-up directions are combined and data on the three-dimensional shape indicating the entire shape of the object are made up. In order to combine the pieces of data on the three-dimensional shape into the entire shape of the object, exclusively-used utility software is adopted and calculations are carried out based upon information with respect to the rotation angle position of the rotation stage, etc.

Here, in the above-mentioned conventional apparatus for obtaining data on the three-dimensional shape, during respective image-pick-up stages for picking up images in the respective pick-up directions, pieces of the data on the three-dimensional shape in the respective pick-up directions can be confirmed piece by piece by operating, for example, a radio button, etc.; however, it is not possible to recognize the entire image of the data on the three-dimensional shape that have been already obtained at the respective points of time. In other words, it is not until the above-mentioned composition process has been completed after the image-pick-up process that the entire image of the data on the three-dimensional shape is confirmed.

For this reason, even if there is any portion of the object, the image of which has not been picked up, that is, even if there is any unobtained data, it is not possible to confirm such unobtained data during the image-pick-up process. In such a case, the image-pick-up process for the object has to be carried out all over again.

Moreover, in contrast, another problem is that any portion thereof, the image of which has already been picked up, is again subjected to an image-pick-up process in an overlapped manner, with the result that redundant data on the three-dimensional shape are obtained. In this case, wasteful time might be consumed for the overlapped pick-up processes and other processes.

SUMMARY OF THE INVENTION

An object of the present invention is to provide an apparatus which makes it possible to confirm the entire image of obtained data on the three-dimensional shape easily and also to easily carry out the obtaining process of the data on the three-dimensional shape positively without wasteful time and processes.

In accordance with one preferred embodiment of the present invention, an apparatus for obtaining data on the three-dimensional shape is provided with: a device for producing data on the three-dimensional shape of an object; a display device for displaying an image based on the produced data; a viewpoint variator for changing a viewpoint of an image displayed on the display device; and a position changer for changing the relative positional relationship between the object and the producing device in accordance with the viewpoint change of data on the three-dimensional shape by the viewpoint changer.

These and other objects, features and advantages of the present invention will become apparent upon consideration of the following detailed description of the invention when read in conjunction with the drawing figures.

BRIEF DESCRIPTION OF THE DRAWINGS

FIG. 6 is a flow chart showing a second variation of the process of obtaining data on the three-dimensional shape.

FIG. 7 is a flow chart showing a third variation of the process of obtaining data on the three-dimensional shape.

FIG. 8 is a flow chart showing a fourth variation of the process of obtaining data on the three-dimensional shape.

DESCRIPTION OF THE PREFERRED EMBODIMENTS

Figure 1:
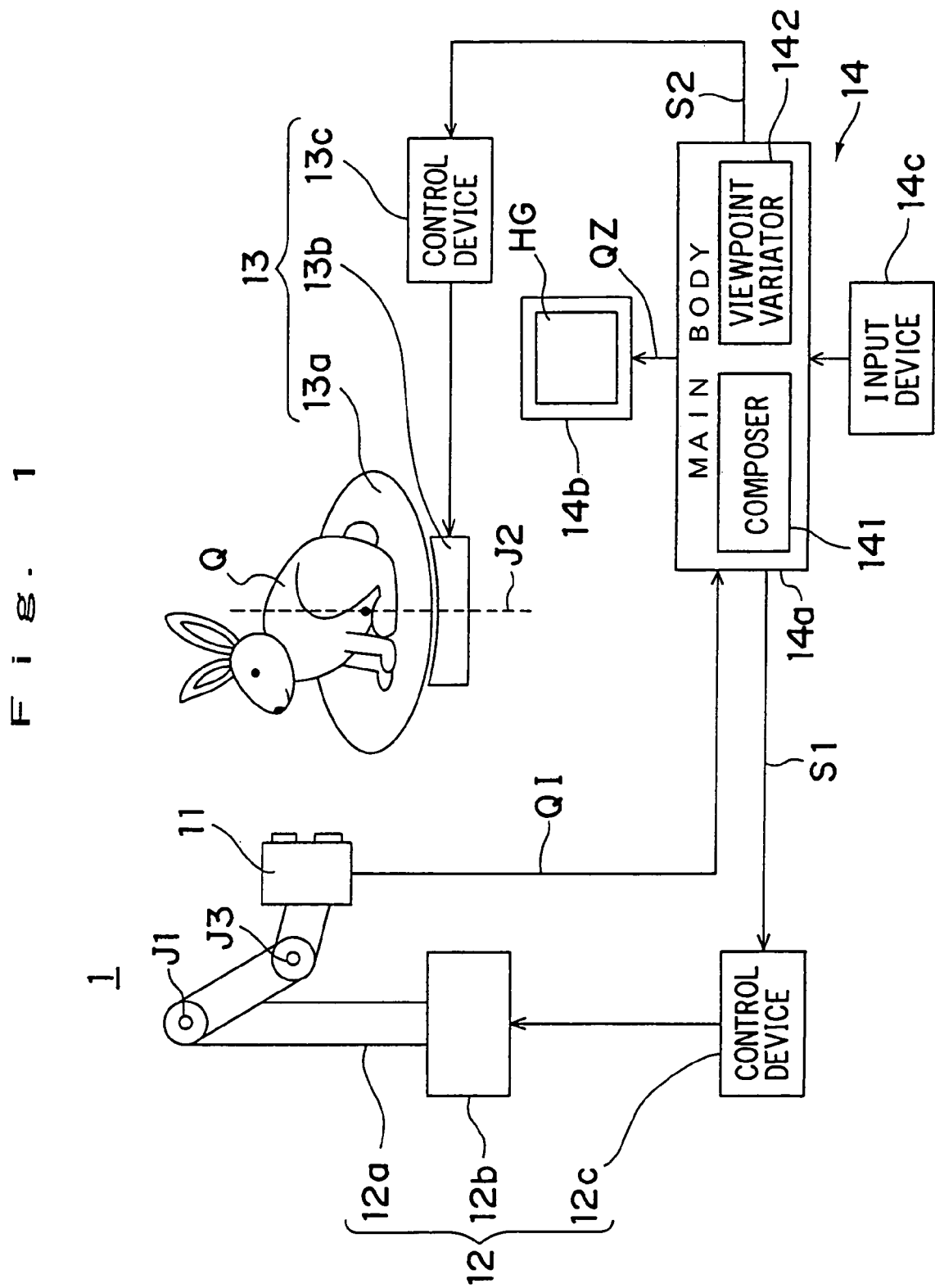
FIG. 1 is a drawing that shows the structure of an apparatus for obtaining data on the three-dimensional shape in accordance with one embodiment of the present invention.

As illustrated in FIG. 1, an apparatus 1 for obtaining data on the three-dimensional shape comprises a three-dimensional camera 11, a manipulator 12, a rotation stage 13 and a host computer 14.

The three-dimensional camera 11 picks up images of an object Q that is a subject of data obtained, and produces data QI on the three-dimensional shape of the object Q based on the picked-up images. Moreover, the camera 11 is also provided with a built-in image sensor for picking up two-dimensional images QY of the object Q, and capable of outputting the two-dimensional image QY simultaneously with the output of the data QI on the three-dimensional shape. The two-dimensional image QY and the data QI on the three-dimensional shape are allowed to be picked up from the same light-receiving axis, that is, from the same viewpoint.

The manipulator 12 includes an arm 12a, a base portion 12b and a control device 12c. The arm 12a has joint axes J1 and J3, and the camera 11 is attached to the top thereof. Based upon an instruction signal S1 output from the host computer 14, the control device 12c controls and drives the arm 12a and the base portion 12b. The manipulator 12 is operated so that the image-pick-up position and pick-up direction of the camera 11 can be controlled. In particular, images of the object Q can be picked up not only from the front side or the profile side, but also from the top thereof, with the camera 11 shifted to a desired position within a vertical plane. With respect to such a manipulator 12, various kinds of those known in the art may be used.

The rotation stage 13 includes a turn table 13a, a driving device 13b and a control device 13c. The turn table 13a is a round plate that is rotatable around a rotation axis J2 in the vertical direction, and the object Q is placed thereon. The driving device 13b is provided with a motor, a gear, the rotation axis J2 and a rotation-angle detector, etc. Based upon an instruction signal S2 output from the host computer 14, the control device 13c drives the driving device 13b. When the turn table 13a is rotated, the object Q placed thereon is also rotated so that the positional relationship between the object Q and the camera 11 is changed. By controlling the rotation stage 13 and the manipulator 12, images of the object Q can be picked up by the camera 11 from desired directions, and data QI on the three-dimensional shape of the object Q can be produced from a plurality of desired directions.

The host computer 14 includes a main body 14a, a display device 14b, an input device 14c, etc.

The main body 14a includes a central processing unit (CPU) and peripherals such as ROMs, RAMs, and other peripheral elements, as well as appropriate hardware circuits, a hard disk drive, a magneto-optical disk drive and a CD-ROM drive, etc.

The CPU functions as a composer 141 to integrate a plurality of pieces of data QI on the three-dimensional shape input from the camera 11 converting them into data QZ on the three-dimensional shape based on one coordinate system in cooperation with the peripherals. The CPU also functions as a viewpoint variator 142 to make the viewpoint of the image on the three-dimensional shape displayed on the display device 14b variable in accordance with an operation by the user.

Various programs such as an OS (operating system) program, an interface program, utility programs and application programs are installed in the hard disk, and these programs are executed by the central processing unit so that the composer 141 and the viewpoint variator 142, which were described above, and a GUI (graphical user interface), which will be described later, are achieved.

The input device 14c includes a mouse, a keyboard, etc. On the display screen HG of the display device 14b, the following images, etc. are displayed: an image based on the data QI on the three-dimensional shape obtained by picking up images of the object Q, an image QX based on the data QZ on the three-dimensional shape obtained by composing these data QIs, a virtual rotation stage image 13Z which will be described later, and various other images or characters. Moreover, the image QX based on the data QZ on the three-dimensional shape and the virtual rotation stage image 13Z thus displayed can be rotated on the screen by operations of the input device 14c.

It is also possible to give an instruction signal directly to the control device 13c or the control device 12c by operating the input device 14c so as to rotate the turn table 13a or move the arm 12a and the base portion 12b.

Next, an explanation will be given to functions realized by the GUI of the host computer 14.

Figure 2:
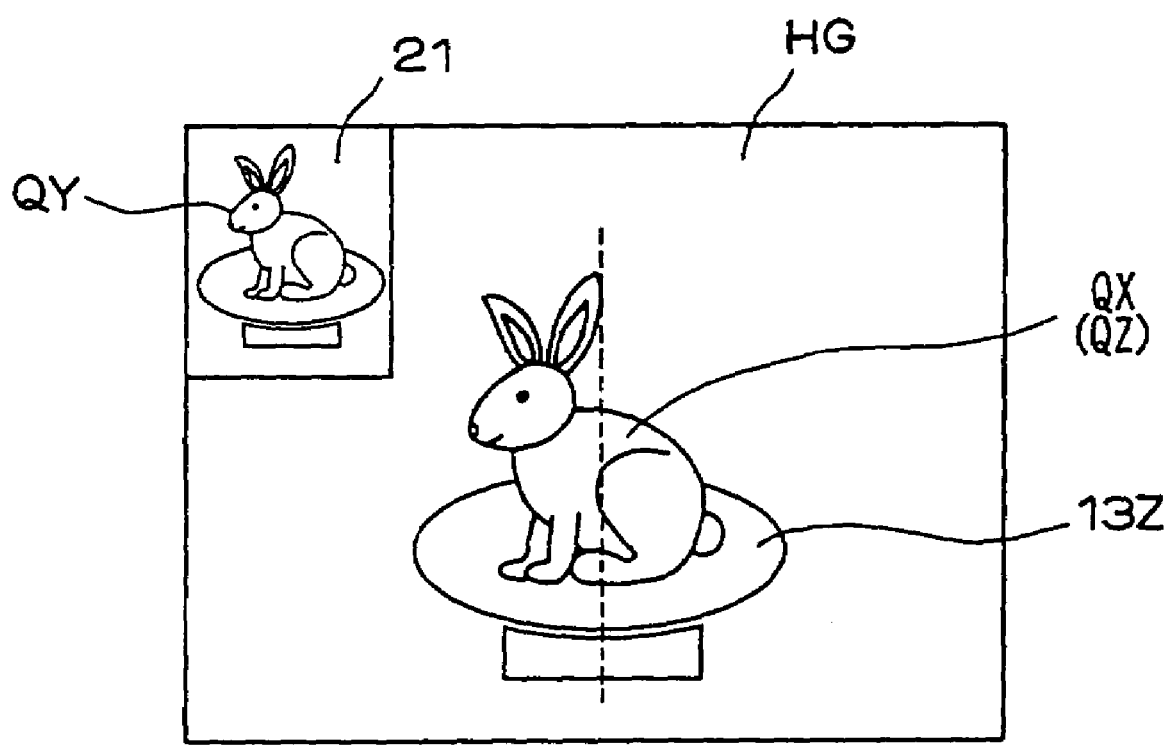
FIG. 2 is a drawing that shows an example of the contents displayed on a display screen.

FIG. 2 shows an example of the contents of a display given on the display screen HG.

As illustrated in FIG. 2, a virtual rotation stage image 13Z, an image QX based on the data QZ on the three-dimensional shape and a two-dimensional image QY are displayed on the display screen HG. Here, the user can operate the input device 14c so as to switch these images between the displayed state and non-display state.

With respect to the virtual rotation stage image 13Z, an image is formed by imitating the real turn table 13a and the driving device 13b through CG (computer graphics) and this image is displayed on the display screen HG. On the display screen HG, the virtual rotation stage image 13Z is displayed in a similar manner to an image obtained by picking up the turn table 13a by the three-dimensional camera 11.

The user is allowed to rotate the virtual rotation stage image 13Z on the display screen HG by shifting the cursor using the mouse, or giving numerical instructions through the keyboard, or other methods. For example, the cursor is placed on the virtual rotation stage image 13Z and dragged in a rotation direction by using the mouse. Then, the virtual rotation stage image 13Z is rotated in accordance with the direction and amount of the drag.

When the virtual rotation stage image 13Z is rotated, an instruction signal S2 is output from the central processing unit of the main body 14a to the control device 13c. Thus, the driving device 13b drives and rotates the turn table 13a in synchronism with the movement of the virtual rotation stage image 13Z. In other words, the rotation of the virtual rotation stage image 13Z is synchronous to the rotation of the actual turn table 13a so that the image state of the virtual rotation stage image 13Z displayed on the display screen HG and the image state of the turn table 13a picked up by camera 11 are controlled so as to be coincident with each other.

The image QX based on the data QZ on the three-dimensional shape is an image obtained by composing the data QI1, QI2 and the like on the three-dimensional shape obtained by the image-pick-up from different directions with respect to the object Q. The composing process is carried out each time an image-pick-up is carried out in each of the image-pick-up directions, with the result that the latest image thus composed is displayed on the display screen HG.

For example, upon completion of the first image-pick-up, an image QX1 based on the data QZ1 on the three-dimensional shape consisting of only the resulting data QI1 on the three-dimensional shape is displayed on the display screen HG. Upon completion of the second image-pick-up, an image QX2 based on the data QZ2 on the three-dimensional shape obtained by composing the first data QI1 on the three-dimensional shape and the data QI2 on the three-dimensional shape resulting from the second image-pick-up is displayed. Upon completion of the third image-pick-up, an image QX3 based on the data QZ3 on the three-dimensional shape obtained by composing the data QI1, QI2, Q13 on the three-dimensional shape of three times is displayed.

The image QX based on the data QZ on the three-dimensional shape is displayed on the display screen HG in a state where it is placed on the virtual rotation stage image 13Z in the same manner as the object Q placed on the turn table 13a. Thus, the image QX is allowed to rotate together with the rotation of the virtual rotation stage image 13Z. In other words, the viewpoint of the display of image QX is controlled in such a manner that the viewing-line direction of the image QX displayed on the display screen HG and the image-pick-up direction of the object Q by the camera 11 are always made coincident with each other.

In the same manner as the case in which the virtual rotation stage image 13Z is rotated, it is possible to control the manipulator 12 by operating the mouse or giving numerical instructions through the key board. In accordance with the operation of the input device 14c, an instruction signal S1 is output from the central processing unit of the main body 14a to the control device 12c so that the arm 12a and the base portion 12b are driven. This makes it possible to pick up images of the object Q from above by the camera 11.

Here, images of the manipulator 12 and the camera 11 normally are not displayed on the display screen HG; however, in the same manner as the case of the virtual rotation stage image 13Z, those virtual images, or icons, may be displayed by means of CG. In this case, the instructions for the direction and amount of shifting of the manipulator 12 can be given by dragging the virtual images.

Therefore, the virtual image on the display screen HG is operated by using the input device 14c so that the rotation stage 13 and the manipulator 12 are controlled; thus, the relative positions between the camera 11 and the object Q can be variably changed to a desired state so that an image of the object Q is picked up by the camera 11 from a desired position.

As illustrated in FIG. 2, a whole-image window 21 is placed on the upper left of the display screen HG. In the whole-image window 21, the above-mentioned two-dimensional image QY is displayed. The two-dimensional image QY is a monitoring image of the object Q picked up by the camera 11. By comparing the two-dimensional image QY and the image QX based on the data QZ on the three-dimensional shape, it is possible to easily confirm whether or not there is not any unobtained image QZN in the data QZ on the three-dimensional shape.

Figure 3A:
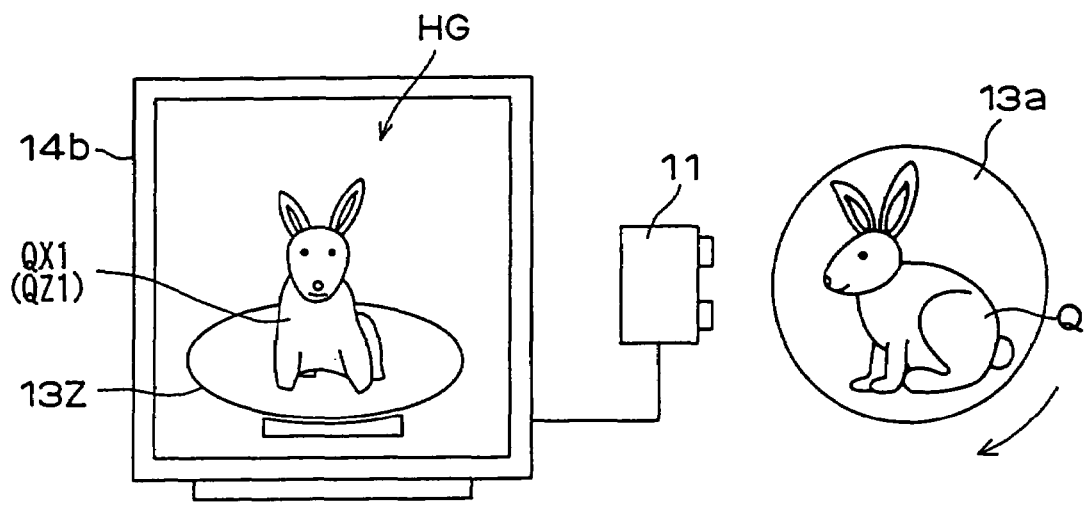
FIGS. 3A and 3B are drawings that explain the method for using the apparatus for obtaining data on the three-dimensional shape.
Figure 3B:
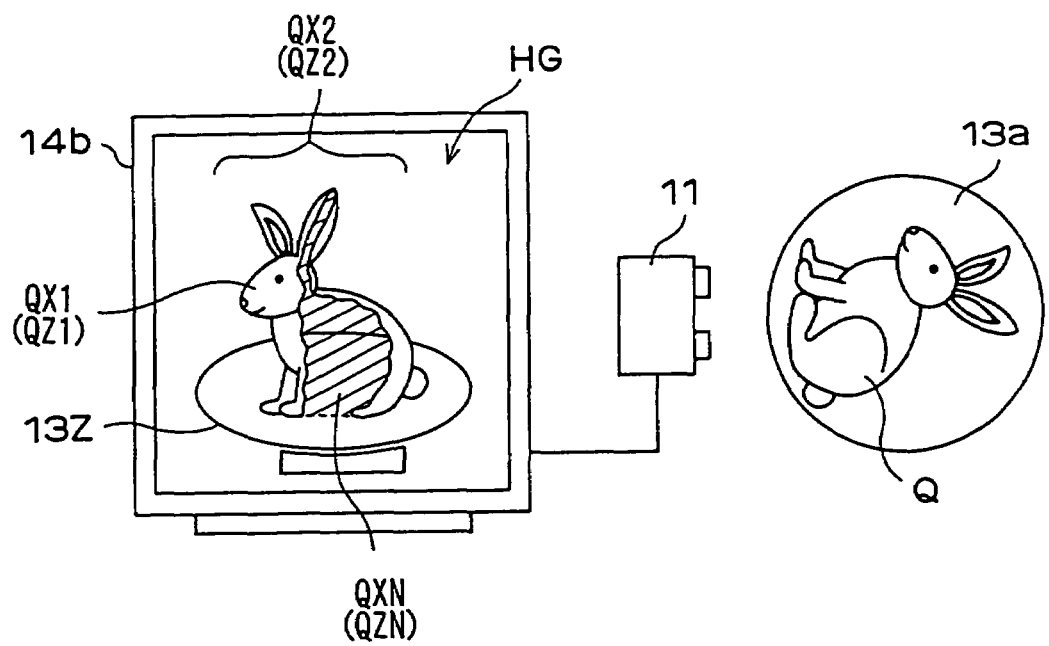

FIGS. 3A and 3B are explanatory drawings that show how to use the apparatus 1. Referring to FIGS. 3A and 3B, an explanation will be given of an obtaining method for data on the three-dimensional shape along the entire circumference of the object Q.

First, as illustrated in FIG. 3A, an image of the object Q is picked up from the front side by the camera 11. Consequently, the image QX1 based on the data QZ1 on the three-dimensional shape is displayed on the display screen HG.

Next, the virtual rotation stage image 13Z is rotated through the operation of the input device 14c. In this case, it is supposed to rotate by 180-degree. In synchronism with this rotation, the rotation stage 13 is rotated around the rotary shaft J2. The relative positional relationship between the camera 11 and the object Q is changed by 180 degrees with respect to the previous image-pick-up position so that it becomes possible to pick up an image of the object Q from behind. Thus, the image of the object Q is picked up from behind by operating the input device 14c.

Then, the data QI1, QI2 on the three-dimensional shape, obtained by image-pick-up processes from the front and rear of the object Q, are composed, with the result that the image QX2 based on the data QZ2 on the three-dimensional shape [see FIG. 3B] is displayed on the display screen HG. Here, at this time, the image QX2 is displayed in the same viewing direction and in the same state as the previous image-pick-up state.

The user operates the input device 14c so as to rotate the virtual rotation stage image 13Z and the image QX2 of the data QZ2 on the three-dimensional shape. When the image QX2 is rotated, unobtained image in the data QZ2 on the three-dimensional shape is clearly observed, if any. If any unobtained image exists in the data QZ2 on the three-dimensional shape, the image QX2 is rotated so that the portion in question frontally faces on the display screen HG, or so that it is well observed. At this time, the user can refer to the two-dimensional image QY displayed on the whole-image window 21.

Since the object Q is also rotated following the rotation of the image QX2, the user can confirm the appearance of the image QX based on the data QZ on the three-dimensional shape on the display screen HG, and pick up an image thereof in this state so that data QI on the three-dimensional shape of the unobtained image portion is produced and input.

In other words, for example, as illustrated in FIG. 3B, the user can put the unobtained image portion QZN on the display screen HG so as to be properly viewed, and pick up an image thereof in this state. Thus, data on the three-dimensional shape of the unobtained image portion QZN is properly obtained.

As described above, the whole image of the data QZ on the three-dimensional shape which has been already produced and input can be confirmed even during an image-pick-up stage so that it is possible to easily confirm the presence of any unobtained image portion QZN, or the state, position, etc. thereof. Moreover, by bringing the image QX displayed on the display screen HG to a desired state for image-pick-up, an actual image is readily picked up in this state; therefore, it is possible to easily obtain required data QI on the three-dimensional shape positively. Consequently, it becomes possible to easily carry out the producing and input process of data QI on the three-dimensional shape positively without any unobtained data.

Next, referring to a flow chart, an explanation will be given of the outline of the entire processes and operations in the apparatus 1.

Figure 4:
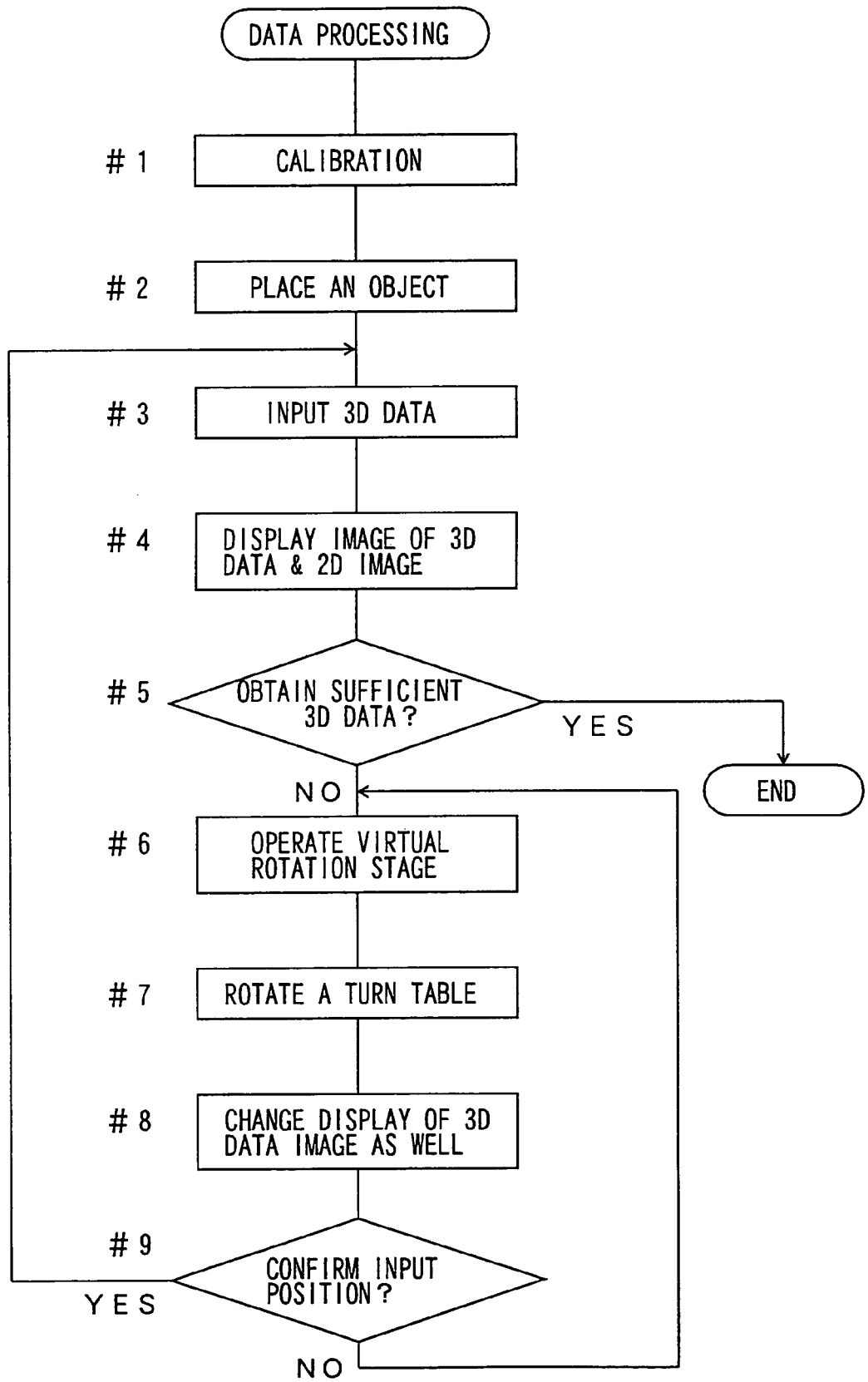
FIG. 4 is a flow chart showing a sequence of obtaining process of data on the three-dimensional shape.

FIG. 4 shows a flow chart of the processing of data on the three-dimensional shape carried out by the host computer 14.

In FIG. 4, first, a calibration process is carried out in accordance with an instruction from the input device 14c (#1). This calibration process is a process for making the coordinate system of the virtual rotation stage image 13Z coincident with the coordinate system of the actual rotation stage 13 (turn table 13a).

With respect to the calibration process, for example, a method is proposed in which: two calibration boards, combined so as to intersect with each other on the rotation axis J2, are placed on the rotation stage 13, and these are measured by the camera 11. Alternatively, another method is proposed in which: a calibration chart or the like is placed within a space in which the camera 11 is capable of obtaining data of three-dimensional shape, and the arm 12a is shifted to several measuring points from which the calibration chart is measured so as to confirm the coordinate system from the results thereof.

Next, when a notice that an object Q is placed on the rotation stage 13 is sent from the user (#2), and an image is picked up by the camera 11 and its data QI on the three-dimensional shape is input to the computer 14 (#3). The input data QI on the three-dimensional shape is composed as data QZ and displayed on the display screen HG as image QX. Here, a two-dimensional image QY is also displayed thereon (#4).

The user compares the two-dimensional image QY and the image QX so as to confirm whether or not there is any unobtained image QZN. In other words, after viewing the image QX, the user makes a decision as to whether or not the data input is sufficient. When receiving a notice from the user that the data QZ on the three-dimensional shape is sufficient (yes at #5), the process is complete.

In the case when the data QZ on the three-dimensional shape is insufficient (no at #5), after the input device 14c has been operated, the virtual rotation stage image 13Z is rotated (#6). According to the rotation of the virtual rotation stage image 13Z, the turn table 13a is rotated or the manipulator 12 is shifted (#7). Consequently, two-dimensional image QY and image QX, updated in their viewing directions, are displayed on the display screen HG (#8).

After the image-pick-up position of the camera 11 has been determined (yes at #9), data on the three-dimensional shape is again input from the camera 11 (#3), and the above-mentioned process is repeated until the user has made a decision that the data on the three-dimensional shape is sufficient and has given a notice thereof (yes at #5).

Some variations of the data processing will be explained next.

Figure 5:
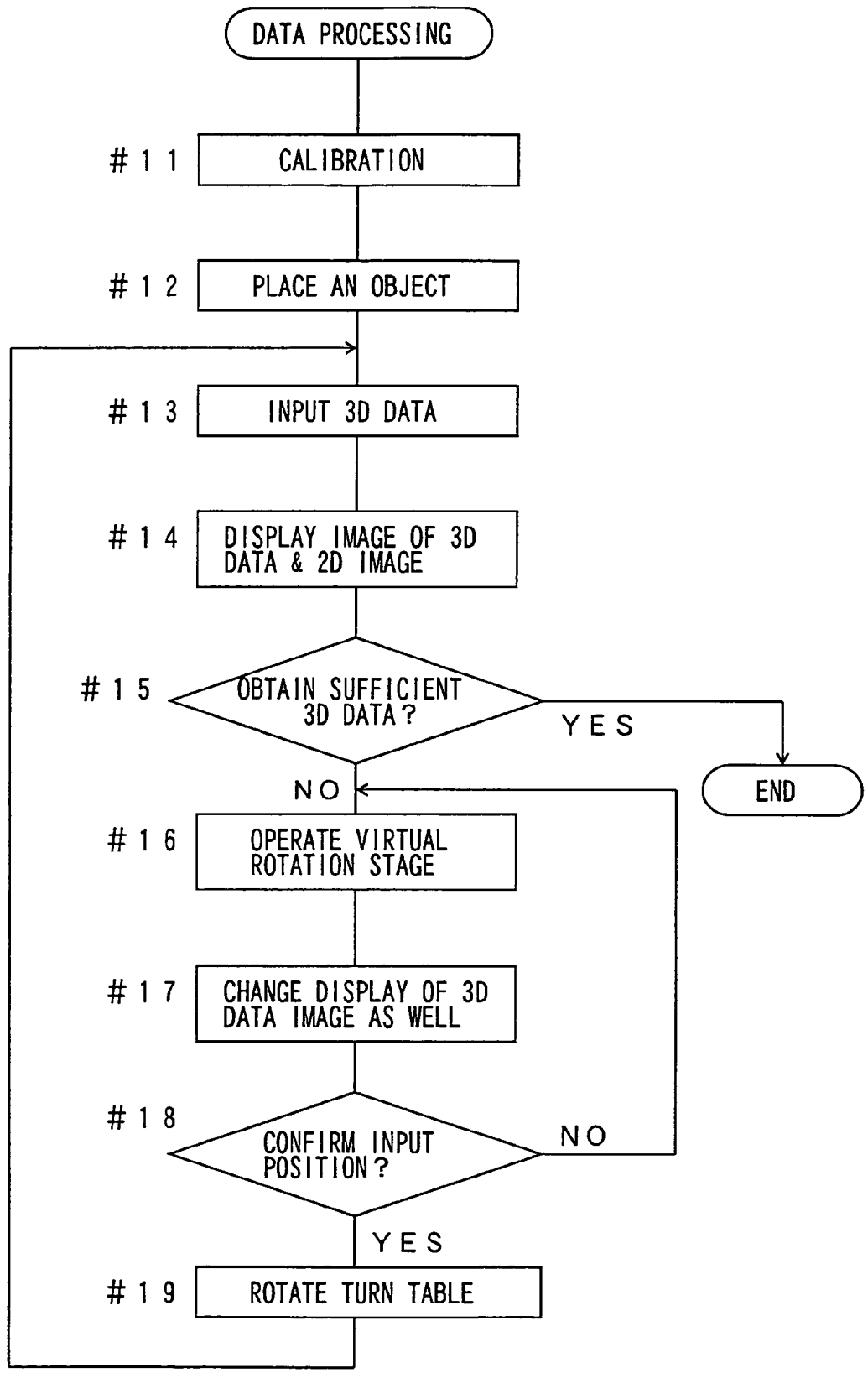
FIG. 5 is a flow chart showing a first variation of the process of obtaining data on the three-dimensional shape.

FIG. 5 is a flow chart showing a first variation of the data processing on the three-dimensional shape.

In the first variation, the virtual rotation stage image 13Z is first rotated. After confirming the position of the virtual rotation stage image 13Z, the real turn table 13a is then rotated.

In FIG. 5, steps #11-15 are the same as the steps #1-5 shown in FIG. 4.

In the case when the data QZ on the three-dimensional shape is insufficient (no at #15), the input device 14c is operated so as to move the virtual rotation stage image 13Z (#16). The turn table 13a and manipulator 12 are not moved at that time. Consequently, image QX based on data QZ on the three-dimensional shape, updated in the viewing direction, is displayed on the display screen HG (#17).

After the image-pick-up position of the camera 11 has been determined and a notice thereof has been given (yes at #18), the turn table 13a and manipulator 12 are moved in accordance with the position (#19), thereby two-dimensional image QY, updated in the viewing direction is displayed on the display screen HG.

Data on the three-dimensional shape is again input from the camera 11 (#13), and the above-mentioned process is repeated until the user has made a decision that the data on the three-dimensional shape is sufficient and has given a notice thereof (yes at #15).

FIG. 6 is a flow chart showing a second variation of the data processing on the three-dimensional shape.

In the second variation, the input device 14c is operated so as to rotate the turn table 13a. In synchronism with the rotation of the turn table 13a, the virtual rotation stage image 13Z is rotated.

In FIG. 6, steps #21-25 are the same as the steps #1-5 shown in FIG. 4.

In the case when the data QZ on the three-dimensional shape is insufficient (no at #25), the input device 14c is operated so as to rotate the turn table 13a or shift the arm 12a and the base portion 12b (#26). In synchronism with the rotation of the turn table 13a, etc., the virtual rotation stage image 13Z is rotated. Consequently, image QX based on data QZ on the three-dimensional shape, updated in the viewing direction, is displayed on the display screen HG (#27).

After the image-pick-up position of the camera 11 has been determined (yes at #28), data on the three-dimensional shape is again input from the camera 11 (#23), and the above-mentioned process is repeated until the user has made a decision that the data on the three-dimensional shape is sufficient and has given a notice thereof (yes at #25).

FIG. 7 is a flow chart showing a third variation of the data processing on the three-dimensional shape.

In the third variation, the turn table 13a is first rotated. After confirming the position of the turn table 13a, the virtual rotation stage image 13Z is then rotated.

In FIG. 7, steps #31-35 are the same as the steps #1-5 shown in FIG. 4.

In the case when the data QZ on the three-dimensional shape is insufficient (no at #35), the input device 14c is operated so as to rotate the turn table 13a or shift the arm 12a and the base portion 12b (#36). The virtual rotation stage image 13Z is not rotated at that time.

After the image-pick-up position of the camera 11 has been determined and a notice thereof has been given (yes at #37), the virtual rotation stage image 13Z is rotated in accordance with the position, and the display of the image QX based on the data QZ on the three-dimensional shape is updated (#38).

Data on the three-dimensional shape is again input from the camera 11 (#33), and the above-mentioned process is repeated until the user has made a decision that the data on the three-dimensional shape is sufficient and has given a notice thereof (yes at #35).

FIG. 8 is a flow chart showing a fourth variation of the data processing on the three-dimensional shape.

In the fourth variation, a three-dimensional camera held by hand and a magnetic sensor for detecting the position of the camera are combined so as to obtain the data on the three-dimensional shape plural times from the different direction without a turn table.

In other words, a three-dimensional camera is held by hand and shifted instead of rotating a turn table as the second and third variations. The position of the camera is detected by the magnetic sensor and the virtual rotation stage image 13Z is rotated in accordance with the detection output.

In FIG. 8, an object is picked up by the camera 11 held by hand so as to produce data QI on the three-dimensional shape, and the data are input from the camera 11 to the computer 14 (#41). The input data QI on the three-dimensional shape are combined as the data QZ and then displayed on the display screen HG as the image QX on the three-dimensional shape. Two-dimensional image QY is also displayed (#42).

A user compares the two-dimensional image QY and the image QX to check whether there is any unobtained portion QZN, that is, the user makes a decision whether the data input is sufficient by checking the image QX. When receiving a notice from the user that the data QZ on the three-dimensional shape is sufficient (yes at #43), the process is complete.

In the case when the data QZ on the three-dimensional shape is insufficient (no at #43), the camera 11 held by hand is shifted (#44) so as to rotate the virtual rotation stage image 13Z in accordance with the position, and the display of the image QX based on the data QZ on the three-dimensional shape is updated (#45).

After the image-pick-up position of the camera 11 has been determined and a notice thereof has been given (yes at #46), data on the three-dimensional shape is again input from the camera 11 (#41), and the above-mentioned process is repeated until the user has made a decision that the data on the three-dimensional shape is sufficient and has given a notice thereof (yes at #43).

In the step #45, it is not realistic to update the display of the image QX based on the data QZ on the three-dimensional shape when the camera 11 is shifted. Instead, the display of the image QX can be updated according to the manual operation indicating determination of the position of the camera 11.

In the above-mentioned embodiment, a camera having a wider field angle may be used as the three-dimensional camera 11 so that the manipulator 12 is omitted, or the manipulator 12 may be omitted depending on the shape, etc. of the object Q. Moreover, it is also possible to omit the rotation stage 13 by increasing the degree of freedom of the manipulator 12.

In the above-mentioned embodiment, the entire construction of the data on the apparatus 1 or the constructions of the respective parts, the contents of the processes, the sequence of the processes, etc. may be appropriately changed within the scope of the present invention.

In the embodiments mentioned above, the camera 11 picks up an image, produces data on the three-dimensional shape, and outputs the data to the computer 14. However, the camera 11 may output the image data obtained by image-picking-up. In that case, the computer 14 produces data on the three-dimensional shape based on the image data.

The camera 11 in the above-mentioned embodiments picks up an image by visible light. However, it may pick up an image by invisible electromagnetic wave, or it may be of non-optical type.

What is claimed:

1. An apparatus for obtaining data on a three-dimensional shape comprising:
    a producing device for producing data on the three-dimensional shape of an object, the data obtained by measuring the three-dimensional shape of the object and for producing data on a two-dimensional shape of the object;
    a display device for displaying images based on the data produced by the producing device;
    a viewpoint variator for changing a viewpoint of a three-dimensional image displayed on the display device; and
    a position changer for changing a relative positional relationship between the object and the producing device in accordance with a viewpoint change of data on the three-dimensional shape by the viewpoint variator.

2. The apparatus according to claim 1, wherein the position changer changes the relative positional relationship between the object and the producing device in synchronism with the viewpoint change of the three-dimensional image by the viewpoint variator.

3. The apparatus according to claim 1, wherein the position changer changes the relative positional relationship between the object and the producing device after confirmation of the viewpoint change of the three-dimensional image by the viewpoint variator.

4. The apparatus according to claim 1, wherein the position changer comprises a rotation stage for placing the object thereon, the rotation stage being rotated in accordance with the viewpoint change of the three-dimensional image by the viewpoint variator.

5. The apparatus according to claim 1, wherein the position changer comprises a manipulator for shifting a position of the producing device, the position of the producing device being shifted by the manipulator in accordance with the viewpoint change of the three-dimensional image by the viewpoint variator.

6. The apparatus according to claim 1, further comprising a composer for combining pieces of data on the three-dimensional shape of the object input from the producing device from a plurality of directions so as to make up data on the three-dimensional shape on one coordinate system, wherein the display device displays the three-dimensional image based on the data on the three-dimensional shape combined by the composer.

7. An apparatus for obtaining data on a three-dimensional shape, comprising:
    a producing device for producing data on the three-dimensional shape of an object, the data obtained by measuring the three-dimensional shape of the object and for producing data on a two-dimensional shape of the object;
    a position changer for changing a relative positional relationship between the object and the producing device;
    a display device for displaying images based on the data produced by the producing device; and
    a viewpoint variator for changing a viewpoint of a three-dimensional image displayed on the display device in accordance with a change of the relative positional relationship between the object and the producing device by the position changer.

8. The apparatus according to claim 7, wherein the viewpoint variator changes the viewpoint of the three-dimensional image in synchronism with the change of the relative positional relationship between the object and the producing device by the position changer.

9. The apparatus according to claim 7, wherein the viewpoint variator changes the viewpoint of the three-dimensional image after confirmation of the change of the relative positional relationship between the object and the producing device by the position changer.

10. The apparatus according to claim 7, wherein the position changer comprises a rotation stage for placing the object thereon.

11. The apparatus according to claim 7, wherein the position changer comprises a manipulator for shifting a position of the producing device.

12. An apparatus for obtaining data on a three-dimensional shape, comprising:
    a producing device capable of changing a relative positional relationship between the producing device and an object, for producing data on the three-dimensional shape of the object, the data obtained by measuring the three-dimensional shape of the object and for producing data on a two-dimensional shape of the object;
    a display device for displaying images based on the data produced by the producing device; and
    a viewpoint variator for changing a viewpoint of a three-dimensional image displayed on the display device in accordance with movement of the producing device relative to the object.

13. An apparatus for obtaining data on a three-dimensional shape comprising:
    a camera for outputting image data of an object;
    a display device for displaying images of the object formed by data on the three-dimensional shape of the object and data on a two-dimensional shape of the object based on the image data output from the camera, wherein the data on the three-dimensional shape of the object is obtained from calculating the three-dimensional shape of the object;
    a viewpoint variator for changing a viewpoint of a three-dimensional image displayed on the display device; and
    a position changer for changing a relative positional relationship between the object and the camera in accordance with a viewpoint change of data on the three-dimensional shape by the viewpoint variator.

14. The apparatus according to claim 13, wherein the position changer changes the relative positional relationship between the object and the camera in synchronism with the viewpoint change of the three-dimensional image by the viewpoint variator.

15. The apparatus according to claim 13, wherein the position changer changes the relative positional relationship between the object and the camera after confirmation of the viewpoint change of the three-dimensional image by the viewpoint variator.

16. The apparatus according to claim 13, wherein the position changer comprises a rotation stage for placing the object thereon, the rotation stage being rotated in accordance with the viewpoint change of the image by the viewpoint variator.

17. The apparatus according to claim 13, wherein the position changer comprises a manipulator for shifting a position of the camera, the position of the camera being shifted by the manipulator in accordance with the viewpoint change of the three-dimensional image by the viewpoint variator.

18. The apparatus according to claim 13, further comprising a composer for combining pieces of data on the three-dimensional shape of the object input from the camera from a plurality of directions so as to make up data on the three-dimensional shape on one coordinate system, wherein the display device displays the three-dimensional image based on the data on the three-dimensional shape combined by the composer.

19. An apparatus for obtaining data on a three-dimensional shape, comprising:
   a camera for outputting image data of an object;
   a position changer for changing a relative positional relationship between the object and the camera;
   a display device for displaying images of the object formed by data on the three-dimensional shape of the object and data on a two-dimensional shape of the object based on the image data output from the camera wherein the data on the three-dimensional shape of the object is obtained from calculating the three-dimensional shape of the object; and
   a viewpoint variator for changing a viewpoint of a three-dimensional image displayed on the display device in accordance with a change of a relative positional relationship between the object and the camera by the position changer.

20. The apparatus according to claim 19, wherein the viewpoint variator changes the viewpoint of the three-dimensional image in synchronism with the change of the relative positional relationship between the object and the camera by the position changer.

21. The apparatus according to claim 19, wherein the viewpoint variator changes the viewpoint of the three-dimensional image after confirmation of the change of the relative positional relationship between the object and the camera by the position changer.

22. The apparatus according to claim 19, wherein the position changer comprises a rotation stage for placing the object thereon.

23. The apparatus according to claim 19, wherein the position changer comprises a manipulator for shifting a position of the camera.

24. An apparatus for obtaining data on a three-dimensional shape, comprising:
   a camera capable of changing a relative positional relationship between the camera and an object, for outputting image data of the object;
   a display device for displaying images of the object formed by data on the three-dimensional shape of the object and data on a two-dimensional shape of the object based on the image data output from the camera, wherein the data on the three-dimensional shape of the object is obtained by calculating the three-dimensional shape of the object; and
   a viewpoint variator for changing a viewpoint of a three-dimensional image displayed on the display device in accordance with a movement of the camera relative to the object.

* * * * *